(12) United States Patent
Yang

(10) Patent No.: US 12,142,756 B2
(45) Date of Patent: Nov. 12, 2024

(54) ACTIVE MATERIAL BALL COMPOSITE LAYER

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

(*) Notice: Subject to any disclaimer, the term of this patent is extended or adjusted under 35 U.S.C. 154(b) by 0 days.

(21) Appl. No.: 18/347,407

(22) Filed: Jul. 5, 2023

(65) Prior Publication Data

US 2023/0352666 A1 Nov. 2, 2023

Related U.S. Application Data

(63) Continuation of application No. 16/923,245, filed on Jul. 8, 2020, now Pat. No. 11,742,476.

(30) Foreign Application Priority Data

Aug. 5, 2019 (TW) ................................. 108127691

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/386* (2013.01); *H01M 4/405* (2013.01); *H01M 4/483* (2013.01);
(Continued)

(58) Field of Classification Search
None
See application file for complete search history.

(56) References Cited

U.S. PATENT DOCUMENTS 6,001,507 A * 12/1999 Ono ...................... H01M 4/623
429/324
11,742,476 B2 * 8/2023 Yang ...................... H01M 4/405
429/217
(Continued)

FOREIGN PATENT DOCUMENTS

CN 102324317 A 1/2012
CN 103534847 A 1/2014
(Continued)

OTHER PUBLICATIONS

Machine translation of JP 2009-224239, published on Oct. 1, 2009 (Year: 2009).*
(Continued)

*Primary Examiner* — Anca Eoff
(74) *Attorney, Agent, or Firm* — RABIN & BERDO, P.C.

(57) ABSTRACT

The invention discloses an active material ball composite layer. The active material ball composite layer includes a plurality of active material balls and an outer binder. The active material ball include a plurality of active material particles and a first conductive material. An inner binder is used to adhere the active material particles and the first conductive material to form the active material balls. Then, the outer binder is used to adhere the active material balls to form the composite layer. The elasticity of the inner binder is smaller than the elasticity of the outer binder. Therefore, the scale of expansion of the active material particles is efficiently controlled during charging and discharging. The unrecoverable voids would be reduced or avoided.

18 Claims, 4 Drawing Sheets

(51) Int. Cl.
*H01M 4/38* (2006.01)
*H01M 4/40* (2006.01)
*H01M 4/48* (2010.01)
*H01M 4/587* (2010.01)
*H01M 4/62* (2006.01)
*H01M 10/0525* (2010.01)

(52) U.S. Cl.
CPC ........... *H01M 4/587* (2013.01); *H01M 4/622* (2013.01); *H01M 10/0525* (2013.01); *H01M 2004/021* (2013.01)

(56) References Cited

U.S. PATENT DOCUMENTS

| | | |
|---|---|---|
| 2014/0072875 A1 | 3/2014 | Uchiyama |
| 2014/0087256 A1 | 3/2014 | Li et al. |
| 2015/0194677 A1 | 7/2015 | Jeong et al. |
| 2015/0194678 A1 | 7/2015 | Jeong et al. |
| 2016/0104882 A1 | 4/2016 | Yushin et al. |
| 2017/0077497 A1 | 3/2017 | Ogata et al. |
| 2020/0058921 A1 | 2/2020 | Zheng et al. |
| 2021/0036311 A1 | 2/2021 | Matsumura |
| 2021/0043936 A1* | 2/2021 | Yang .................... H01M 4/624 |
| 2023/0216032 A1* | 7/2023 | Yang .................... H01M 4/366 |
| | | 429/231.95 |

FOREIGN PATENT DOCUMENTS

| | | |
|---|---|---|
| CN | 104904049 A | 9/2015 |
| EP | 3373367 A1 | 9/2018 |
| EP | 3660957 A2 | 6/2020 |
| JP | 2009-224239 A | 10/2009 |
| JP | 2014-120459 A | 6/2014 |
| KR | 10-2017-0033123 A | 3/2017 |
| KR | 10-2019-0044397 A | 4/2019 |
| TW | 1508357 B | 11/2015 |
| WO | 2019/052572 A1 | 3/2019 |
| WO | 2019/065030 A1 | 4/2019 |

OTHER PUBLICATIONS

Extended European Search Report issued Dec. 11, 2020 in Application No. 20185816.4.
Extended European Search Report issued Dec. 15, 2020 in Application No. 20185819.8.

* cited by examiner

ACTIVE MATERIAL BALL COMPOSITE LAYER

CROSS REFERENCES TO RELATED APPLICATIONS

This application is a continuation of the U.S. patent application Ser. No. 16/923,245, filed on Jul. 8, 2020, which claims priority to Taiwanese Patent Application 108127691, filed in the Taiwanese Patent Office on Aug. 5, 2019, the entire contents of which is being incorporated herein by reference.

BACKGROUND OF THE INVENTION

Field of Invention

The present invention relates to a composite layer for an electrochemical device, in particular to a composite layer with the active material balls, which are formed from the active materials with huge volume change during electrochemical reactions.

Related Art

For the negative electrode materials of the lithium ion batteries, the theoretical volumetric capacity of the conventional graphite carbon negative electrode materials is only 372 mAh/g, which limits the improvement of the energy density of the lithium ion batteries. While the volumetric capacity is up to 4200 mAh/g, silicon is became the focus of current research. However, when elementary silicon is used as a negative electrode, a huge volume change (up to 300%) would be occurred during the charging and discharging processes, which may easily lead to the formation of a void interface between the electrolyte and the molecular silicon to cause the continued decline in electrode performance. The possible problems caused by the void interface may include:
 a. Decrease the electronic conductivity: The expansion of the silicon separates the contacts of the electrically conductive materials; and
 b. Ion conductivity decreases: Regardless of solid or liquid electrolytes, due to the void zone formed by the expansion of the silicon, the ion transmission distance becomes longer or the contact resistance of the interface increases significantly.

At present, the most common implementation method of the silicon negative electrode is to mix silicon material and graphite material (5%-10% silicon material plus 95%-90% graphite material). And then the electrically conductive material and the binder are added to form a silicon-graphite mixed negative electrode layer with the thickness of about 80-85 micron. The above-mentioned silicon material ratio can be adjusted according to the required energy density, and the thickness can also be adjusted according to the coating process.

Theoretically, in order to effectively control the volume change of the silicon materials and reduce the voids formed by the volume change and related derived problems, a rigid binder such as a cross-linked type is used to generate strong adhesion. Therefore, the volume change of the silicon materials during charging and discharging processes will be controlled. However, in order to increase the capacity, the amount of the electrically conductive material and the binder should not be too large, and the proportion of the active material can be increased as much as possible. Also, in order to facilitate the coating in a larger area, the proportion of the rigid binder should not be too high. Such materials will make the electrode layer brittle and easy to crack, which will cause a short circuit. Further, the higher amount of the rigid binder is added, the more thickness of the electrode layer is increased. It is easier to be cracked, and it is more difficult to perform a thick coating. Therefore, it is practically difficult to effectively control the derived problems caused by the voids with the rigid binder. These all lead to a decrease in electrical conductivity and ion conductivity.

The U.S. Pat. No. 8,263,265 utilizes a reduction method such as the magnesium metal to reduce the silicon dioxide. Then an acidification is performed to remove the magnesium oxide, and form a porous carbon-silicon composite to serve as a negative electrode active material. Therefore, high capacity and excellent capacity retention rate are achieved. However, this patent mainly uses the porous composites to absorb the volume expansion of the silicon material. Although it can slightly handle the problem of the voids, it still cannot be effectively controlled and overcome the problems completely.

Therefore, this invention provides a brand new active material ball composite layer to overcome the conventional shortages.

SUMMARY OF THE INVENTION

It is an objective of this invention to provide an active material ball composite layer to overcome the forgoing shortcomings. A higher proportion of the rigid binder is utilized to form the active material balls. Therefore, the huge volume change of the active material during charging and discharging processes is effectively controlled and the problem of the voids and its derived problems can be solved.

Also, it is another objective of this invention to provide an active material ball composite layer, which includes an inner binder with high expansion resistance inside the active material balls and an outer binder with higher elasticity outside the active material balls. Therefore, in the case of controlling the volume expansion of the active material particles, the flexibility of the composite layer is retained, and the specific capacity, electrical conductivity, and ion conductivity are all improved.

In order to implement the abovementioned, this invention discloses an active material ball composite layer, which includes a plurality of active material balls, and a second electrically conductive material and an outer binder, disposed outside of the active material balls. The outer binder adheres the active material balls and the second electrically conductive material. The active material balls includes a plurality of first active material particles, a first electrically conductive material and an inner binder. The elasticity of the inner binder is smaller than the elasticity of the outer binder, and the volume content of the first electrically conductive material within the active material balls is greater than the volume content of the second electrically conductive material of the total volume other than the active material balls. The huge volume change of the active material particles during charging and discharging processes is effectively controlled by the different elasticity of the inner binder and the outer binder of this invention. The problem of the voids and its derived problems can be solved, and the flexibility of the composite layer is retained.

Further, the active material balls of this invention include a plurality of second active material particles with a material characteristic different from a material characteristic of the first active material particles.

Besides, the active material ball composite layer of this invention further includes a third active material particles inside of the active material balls. The third active material particles have a material characteristic different from the material characteristic of the first active material particles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
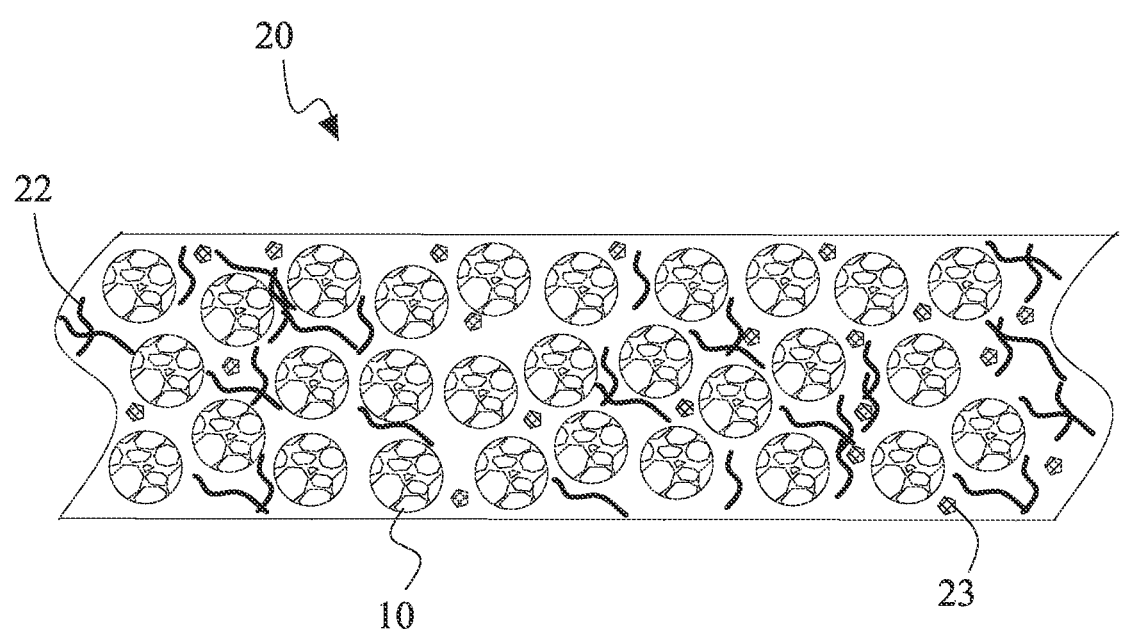
FIG. 1 is a schematic diagram of the active material ball composite layer of this invention.
Figure 2:
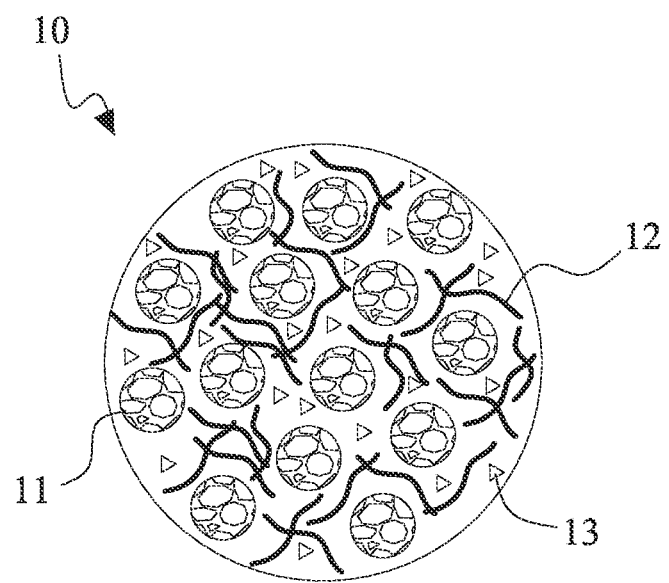
FIG. 2 is a schematic diagram of the active material ball of this invention.

Please refer to FIG. 1 and FIG. 2, which is a schematic diagram of the active material ball composite layer of this invention, and a schematic diagram of the active material ball of this invention, respectively. The active material ball composite layer 20 of this invention is composed of the pre-formed active material balls 10, an outer binder 23 and a second electrically conductive material 22. The pre-formed active material ball 10 includes a plurality of first active material particles 11, a first electrically conductive material 12 and an inner binder 13. An average particle diameter D50 of the first active material particles 11 is not greater than 60% of a diameter of the active material ball 10. For example, in case of the diameter of the active material ball 10 is 50-60 micrometers, the average particle diameter D50 of the first active material particles 11 would be 30-36 micrometers. The first active material particles 11 are the active material particles with huge volume change during extraction and insertion reactions. The volume change of the first active material particles 11 during charging and discharging processes is 15% to 400%. For example, the first active material particles 11 may selected from the silicon based active material particles with more than 200% volume change or a lithium nickel manganese cobalt (NMC). The silicon based active material particles include all active material containing silicon, such as elementary silicon or silicon oxide (SiOx).

The first active material particles 11, the first electrically conductive material 12 and the inner binder 13 are mixed to form the active material ball 10 with the average particle diameter D50 is not greater than 70% of a thickness of the composite electrode layer. The active material ball 10 is pre-formed as an essential sphere. In the following description, the active material ball composite layer may be an electrode layer. It should be emphasized that the active material balls 10 are made by grouping or crushing and mixing by a ball milling process. Therefore, the so-called spheres are only examples and are not limited to spheres, and the spheres may not only have a perfect circular cross-section or a regular sphere. The three-dimensional shape of any sphere, approximate sphere or other non-sphere should be included.

The inner binder 13 mainly includes a cross-linked polymer, i.e. the content of the cross-linked polymer in the volume percentage of the inner binder is the highest. For example, the volume content of the cross-linked polymer in the first binder is greater than 70%. Also, with a higher proportion of the first electrically conductive material 12 and the inner binder 13, it can provide sufficient high expansion constraint force and electrical conductivity. In the conventional electrode layer (in the example where silicon and/or silicon oxide (Si/SiOx) and graphite are directly mixed), the volume content of the electrically conductive material is about 5%, the volume content of the binder is about 7%, and the volume content of the active materials, including silicon and/or silicon oxide (Si/SiOx) and graphite, is about 88%. However, in this invention, the volume content of the first electrically conductive material 12 in the active material balls 10 is 7% to 10%, and the volume content of the inner binder 13 in the active material balls 10 is 10% to 15%. Therefore, with a higher amount of the inner binder 13, whose main component is the binder with lesser elasticity (also called the rigid binder), such as a cross-linked polymer, it can greatly increase the expansion constraint force to effectively control the huge volume change of the active materials during charging and discharging processes. On the other hand, the inner binder 13 may also include the binder with greater elasticity, such as the linear polymer. The inner binder 13 may have 10% linear polymer in the volume percentage, and 90% cross-linked polymer in the volume percentage. That means the volume content of the linear polymer of the inner binder layer 13 is less than the volume content of the cross-linked polymer of the inner binder 13.

The first electrically conductive material 12 may include an artificial graphite, a carbon black, an acetylene black, a graphene, a carbon nanotube, a vapor grown carbon fiber (VGCF) or a combination thereof. The inner binder 13 is mainly a cross-linked polymer with strong physical or chemical adhesion and with is less elasticity. For example, the inner binder 13 may also have good electron donor with acid radical, including a polyimide (PI), an acrylic resin, epoxy, or a combination thereof. With above-mentioned higher amount of the binder, the inner binder 13 with strong rigidity can be used to constraint the active material particles 11 to control the expansion scale of the active material particles after charging and discharging. Therefore, the irrecoverable void zone would be controlled or eliminated.

Figure 3:
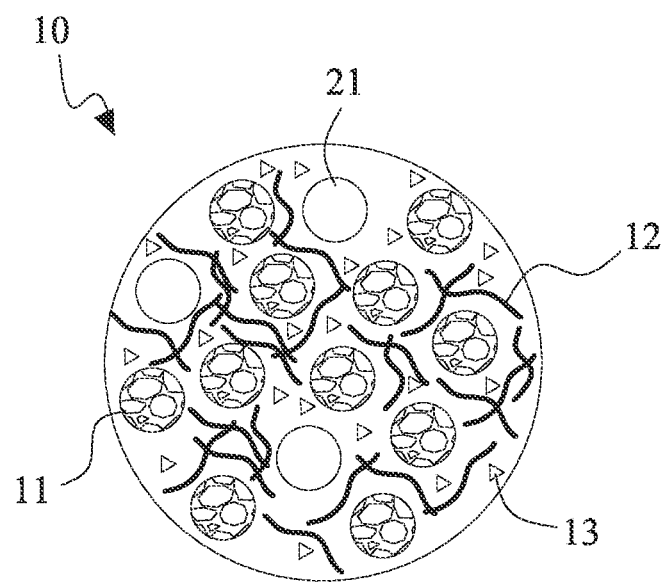
FIG. 3 is a schematic diagram of another embodiment of the active material ball of this invention.

Please refer to FIG. 3, there have a plurality of second active material particles 21 added in the active material balls 10. The material characteristic of the second active material particles 21 is different from the material characteristic of the first active material particles 11. For example, the second active material particles 21 may select from the active materials, which also have good electrically conductivity, such as graphite. Due to the graphite have higher electrically conductivity, the using amount of the first electrically conductive material 12 can be decreased to enhance the energy density.

The higher amount of the rigid inner binder 13, i.e. with lesser elasticity, and the first electrically conductive material 12 will reduce the bending ability of the composite layer, and also limit to reduce the ratio of the remaining active materials. Therefore, the specific capacity will be reduced. However, the active material balls 10 of the present invention is only served as part of the active materials in the electrode layer structure, there are no such concerns, that is, these defects will not affect the electrode layer structure of this invention, which will be described in detail later.

In order to make the aforementioned active material balls 10 more clear, the following description only illustrates one possible manufacturing process. The active material particles 11, the first electrically conductive material 12 and the inner binder 13 are mixed with a solvent and then coated on the temporary substrate. The temporary substrate is removed after successively drying and removing the solvent. And then by crushing and using ball milling, it can obtain the active material balls 10 with the average particle diameter D50 not greater than 70% of a thickness of the composite electrode layer. In the following description, the active material ball composite layer is an electrode layer.

Please refer to FIG. 1, the above-mentioned active material balls 10 and the outer binder 23 may be mixed to form the active material ball composite layer 20 to serve as an electrochemical electrode layer, such as a negative electrode. The average particle diameter D50 of the active material balls 10 is not greater than 70% of the thickness of the electrode layer. For example, when the thickness of the electrode layer is 90 micrometers, the average particle diameter D50 of the active material balls 10 is not greater than 72 micrometers. Also, the elasticity of the inner binder 13 is different with the elasticity of the outer binder 23. The elasticity of the outer binder 23 is higher than the elasticity of the inner binder 13. That is the proportion of the linear polymer with better elasticity in the outer binder 23 is higher than that of the linear polymer in the inner binder 13. The linear polymer with better elasticity of the outer binder 23 is selected from a polyvinylidene fluoride (PVDF), a polyvinylidene fluoride haxafluoropropylene (PVDF-HFP), a styrene-butadiene rubber (SBR), a sodium carboxymethyl cellulose (CMC) or a combination thereof.

Figure 4:
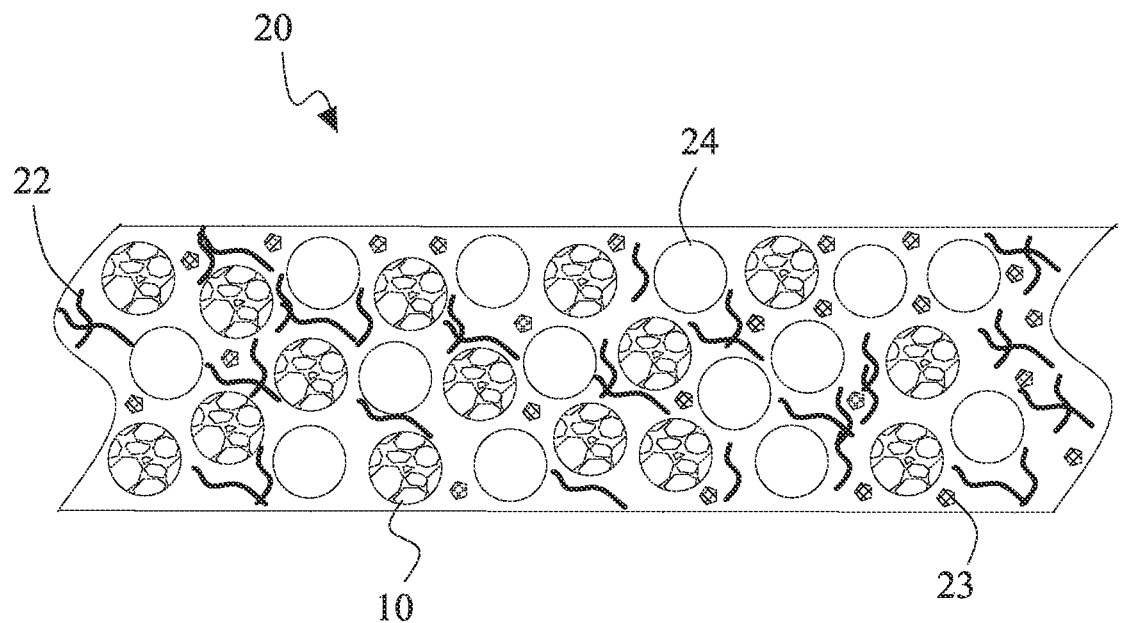
FIG. 4 is a schematic diagram of another embodiment of the active material ball composite layer of this invention.

Beside, please refer to FIG. 4, the active material ball composite layer 20 further includes a plurality of third active material particles 24 and the second electrically conductive material 22. The material characteristic of the third active material particles 24, which may be a carbon material such as graphite, is different from the material characteristic of the first active material particles 11. The second electrically conductive material 22 may include an artificial graphite, a carbon black, an acetylene black, a graphene, a carbon nanotube, a vapor grown carbon fiber (VGCF) or a combination thereof. The composition of the first electrically conductive material 12 and the second electrically conductive material 22 are the same or different. For example, the volume percentage of the second electrically conductive material 22 is 1-1.5%, and the volume percentage of the outer binder 23 is 2-4%. The third active material particles 24 and the second active material particles 21 may select from the same or different materials.

Certainly, both the inner binder 13 and the outer binder 23 may contain the rigid binder (cross-linked polymer) and the linear polymer with better elasticity, but with different proportion. For example, the volume percentage of the cross-linked polymer in the inner binder 13 is greater than that of the linear polymer, and the volume percentage of the linear polymer in the outer binder 23 is greater than that of the cross-linked polymer. Comparing with the inner binder 13 and the outer binder 23, the volume percentage of the linear polymer in the outer binder 23 is greater than the volume percentage of the linear polymer in the inner binder 13.

The outer binder 23 is mainly composed of the linear polymer with better elasticity, so that the overall electrode layer structure can still have quite good flexibility. Although the inner binder 13 of the active material balls 10 is mainly composed of the rigid binder, it is mainly used to constraint the active materials, which are formed into a sphere. For the overall electrode layer, it is only an internal granular structure (the average particle diameter D50 of the active material balls 10 is not greater than 70% of the thickness of the electrode layer). The main flexibility still depends on the outer binder 23 (outside the active material balls 10) for the overall electrode layer. Therefore, the overall electrode layer structure can still have a good flexibility. Furthermore, the third active material particles 24 is selected from the graphite. Due to the graphite have higher electrically conductivity, the using amount of the external second electrically conductive material 22 can be decreased to maintain the proportion of the overall active materials. In other words, a higher proportion of the first electrically conductive material 12 is concentrated near the first active material particles 11. For the overall composite layer, the proportion of the active materials will not be reduced due to the increase in the proportion of the first electrically conductive material 12.

Moreover, in addition to the aforementioned components, such as the active material balls, the electrically conductive materials, the binders and etc. The remaining space in the electrode layer is filled with an electrolyte system. This electrolyte system may be a solid electrolyte, a liquid electrolyte, or a combination thereof.

Accordingly, in this invention, the active material ball composite layer have different characteristics inside and outside of the active material balls, for example, the differences of the types for the internal and external active materials, the differences of the elasticity for the internal and external binders, the differences of the proportion for the internal and external electrically conductive materials, or even a hydrogen ion concentration of the inner binder is different from a hydrogen ion concentration of the outer binder. For example, when the first active material particles 11 in the active material balls 10 are not neutral, that is, the pH is not equal to 7, an appropriate acid-base binder can be selected to adjust or modify. For example, when the first active material particles 11 are alkaline, the inner binder 13 can use an acidic binder corresponding to this alkalinity to obtain a better adhesion. While the outer binder can use a neutral material to avoid damage, such as corrosion, to the substrate that is subsequently coated on the active material composite layer.

The following Table 1 illustrates with a single data.

TABLE 1

| | Conventional Si/SiOx mixed with graphite | The active material balls of this invention mixed with graphite | | |
| --- | --- | --- | --- | --- |
| | | The overall composite layer | active material balls (100%) | Outside the active material balls (100%) |
| electrically conductive material | 5% | 5% | 8% | 2-3% |
| binder | 7% | 7% | 12% | 4-5% |
| active materials | Si/SiOx plus graphite 88% | 88% | Si/SiOx 80% | Graphite 92% |

Therefore, on the condition that the ratio of the conductivity materials and the binder is maintained, the volume expansion of the active material particles can be effectively controlled during charge and discharge process. Moreover, the problem of the voids and its derived problems can be solved. Also the flexibility of the composite layer is retained, and the specific capacity, electrical conductivity, and ion conductivity are all improved. Of course, in the foregoing Table 1, the data of the present invention is only a schematic illustration, and is not intended to limit the use of this ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active material ball composite layer, comprising:
    a plurality of active material balls, wherein each of the active material balls includes a plurality of first active material particles, a first electrically conductive material and an inner binder, wherein the first active material particles and the first electrically conductive material are adhered by the inner binder;
    a second electrically conductive material, disposed outside of the active material balls; and
    an outer binder, adhering the active material balls and the second electrically conductive material;
    wherein the inner binder includes a cross-linked polymer and a linear polymer;
    wherein a volume content of the linear polymer of the inner binder layer is less than a volume content of the cross-linked polymer of the inner binder; and
    wherein a pH of the inner binder is adjusted to correspond to a pH of the first active material particles to make a pH of the active material balls neutral, and a pH of the outer binder is neutral.

2. The active material ball composite layer of claim 1, wherein the volume content of the first electrically conductive material in the active material balls is 7-10%; and
    wherein the volume content of the inner binder in the active material balls is 10-15%.

3. The active material ball composite layer of claim 1, wherein a volume change of the first active material particles during extraction and insertion reactions is 15% to 400%.

4. The active material ball composite layer of claim 1, wherein the first active material particles are silicon based active material particles or a lithium nickel manganese cobalt (NMC).

5. The active material ball composite layer of claim 4, wherein the first active material particles are selected from a silicon and/or a silicon oxide particle, and an average particle diameter D50 of the first active material particles is not greater than 60% of a diameter of the active material balls.

6. The active material ball composite layer of claim 1, wherein the cross-linked polymer is selected from a polyimide (PI), an acrylic resin, epoxy, or a combination thereof.

7. The active material ball composite layer of claim 1, further including a plurality of second active material particles with a material characteristic different from a material characteristic of the first active material particles.

8. The active material ball composite layer of claim 7, wherein the second active material particles are selected from carbon.

9. The active material ball composite layer of claim 1, wherein a volume percentage of the outer binder is 2-4%.

10. The active material ball composite layer of claim 1, wherein the first electrically conductive material and the second electrically conductive material are selected from an artificial graphite, a carbon black, an acetylene black, a graphene, a carbon nanotube, a vapor grown carbon fiber (VGCF) or a combination thereof, and the first electrically conductive material and the second electrically conductive material are different.

11. An active material ball composite layer, comprising:
    a plurality of active material balls, wherein each of the active material balls includes a plurality of first active material particles, a first electrically conductive material and an inner binder, wherein the first active material particles and the first electrically conductive material are adhered by the inner binder;
    a second electrically conductive material, disposed outside of the active material balls; and
    an outer binder, adhering the active material balls and the second electrically conductive material;
    wherein the inner binder includes a cross-linked polymer and a linear polymer;
    wherein a volume content of the linear polymer of the inner binder layer is less than a volume content of the cross-linked polymer of the inner binder;
    wherein a pH of the active material balls is neutral, and a pH of the outer binder is neutral; and
    wherein a pH of the inner binder and a pH of the first active material particles are non-neutral.

12. The active material ball composite layer of claim 11, wherein a volume content of the cross-linked polymer in the inner binder is greater than 70%.

13. The active material ball composite layer of claim 11, wherein a volume change of the first active material particles during extraction and insertion reactions is 15% to 400%.

14. The active material ball composite layer of claim 11, wherein the first active material particles are silicon based active material particles or lithium nickel manganese cobalt (NMC).

15. The active material ball composite layer of claim 14, wherein the first active material particles are selected from a silicon and a silicon oxide particle, and an average particle diameter D50 of the first active material particles is not greater than 60% of a diameter of the active material balls.

16. The active material ball composite layer of claim 11, wherein the cross-linked polymer is selected from a polyimide (PI), an acrylic resin, epoxy, or a combination thereof.

17. The active material ball composite layer of claim 11, further including a plurality of second active material particles with a material characteristic different from a material characteristic of the first active material particles.

18. The active material ball composite layer of claim 17, wherein the second active material particles are carbon.

* * * * *